Figure 1:
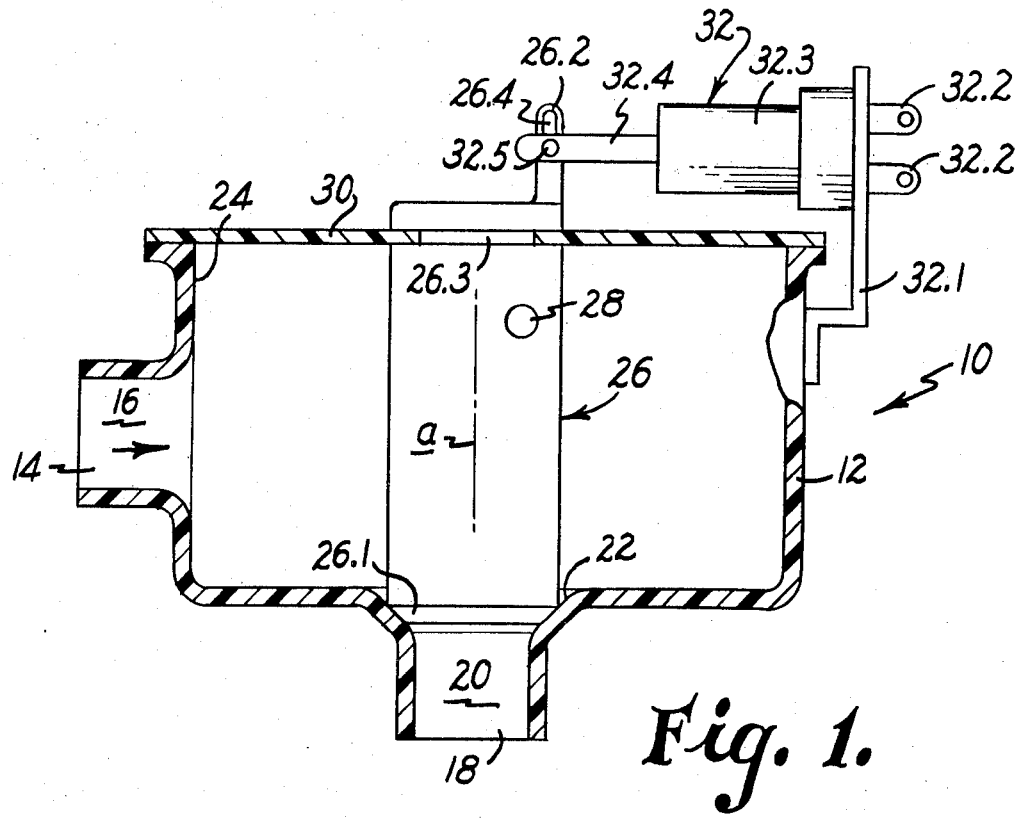

United States Patent [19]

Hossfeld et al.

[11] 3,864,031

[45] Feb. 4, 1975

[54] FLUID CONTROL VALVE

[75] Inventors: Roderick J. Hossfeld, Northampton; Paul E. Tartaglia, Amherst; Daniel R. Pimentel, Seekonk, all of Mass.

[73] Assignee: Texas Instruments Incorporated, Dallas, Tex.

[22] Filed: June 11, 1973

[21] Appl. No.: 368,922

[52] U.S. Cl................. 251/138, 251/298, 251/303, 251/335 A
[51] Int. Cl............................................. F16k 31/10
[58] Field of Search ....... 251/303, 298, 335 A, 129, 251/138

[56] References Cited
UNITED STATES PATENTS

| | | | |
|---|---|---|---|
| 495,213 | 4/1893 | Adams | 251/298 |
| 2,608,207 | 8/1952 | Le Van | 251/335 A |
| 2,912,012 | 11/1959 | Klingler | 251/303 X |
| 3,608,579 | 9/1971 | Moore | 251/298 X |

Primary Examiner—Arnold Rosenthal
Attorney, Agent, or Firm—Harold Levine; John A. Haug; James P. McAndrews

[57] ABSTRACT

A valve device particularly adapted for remote electrical operation at low power levels has actuator means which are located outside a valve body but which are operatively connected to a valve member within the body through a flexible diaphragm which seals the valve body without excessively restricting movement of the valve member. The valve member is pivotally mounted in the body to be moved with selected force in response to fluid being introduced into the valve body from an open valve position disposed in a valve inlet passage to a closed valve position. The valve member is moved from closed valve position to open valve position against the noted force when the actuator means is selectively actuated.

2 Claims, 2 Drawing Figures

PATENTED FEB 4 1975
3,864,031

FLUID CONTROL VALVE

The operation of fluid control valves usually requires a considerable amount of energy in order to overcome forces which are needed for maintaining leak-type closure and sealing of the valves. Over the years, various arrangements have been developed to provide remote electrical operation for such valves in household appliances and the like. However, because of the energy levels required for operating such valves, these remote operating arrangements have tended to be quite complicated and expensive.

It is an object of this invention to provide a novel and improved fluid control valve; to provide such a valve which is remotely operable at low electrical power levels; to provide such a valve which closes automatically on the occurrence of an electrical power failure or failure of an electrical component of a valve; and to provide such a valve which is of rugged, reliable and inexpensive construction.

Briefly described, the novel and improved valve device of this invention includes a valve body having an inlet passage and an outlet passage and having a valve seat between the passages, the valve body also having an aperture aligned with the valve seat. A valve member is pivotally mounted in the valve body to be moved with a selected force from an open valve position located in the noted valve inlet passage to a closed valve position engaging the valve seat, this movement being in response to the flow of fluid in the valve inlet passage. The valve member has a valve stem portion extending exteriorly of the valve body through the noted body aperture and a flexible diaphragm is secured to the valve member and to the valve body around the body aperture for sealing the valve body without significantly restricting such pivotal movement of the valve member. Actuator means are mounted on the valve body outside the body in operative engagement with the valve stem portion for moving the valve member to open valve position against the noted fluid forces when desired.

Figure 2:
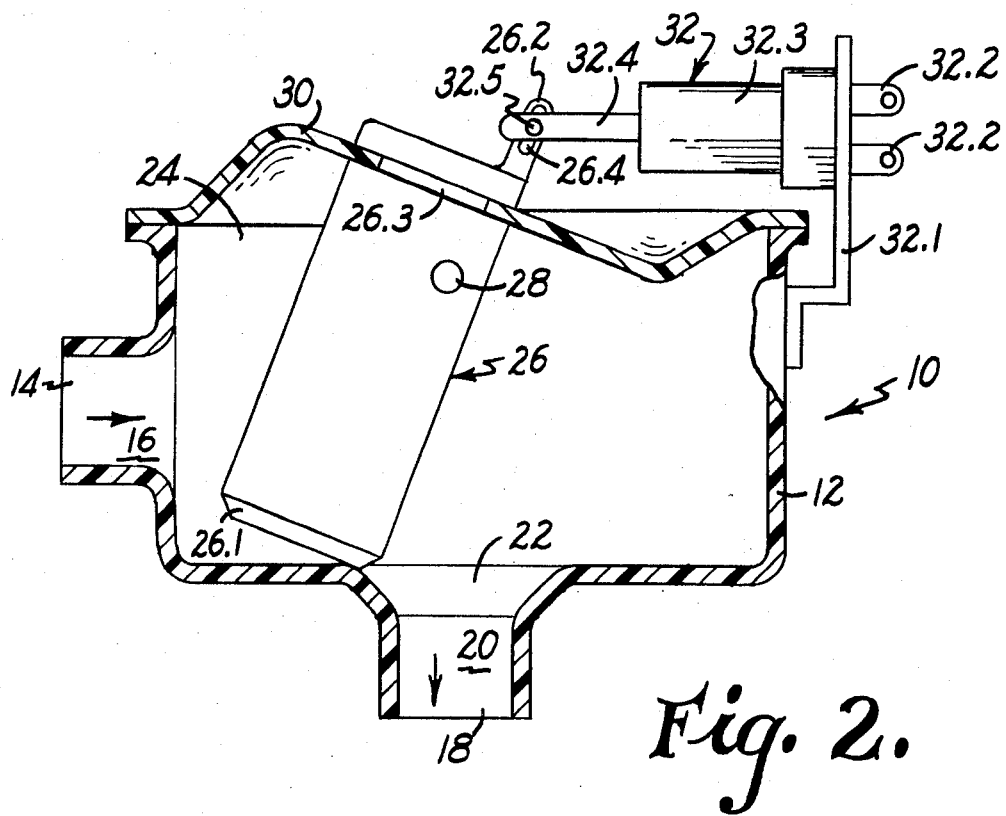

Other objects, advantages and details of the novel and improved valve device of this invention appear in the following detailed description of preferred embodiments of the invention, the detailed description referring to the drawings in which:

FIG. 1 is a transverse section view through the valve of this invention illustrating the valve in closed valve position; and FIG. 2 is a transverse section view similar to FIG. 1 illustrating the valve in open valve position.

Referring to the drawing, 10 in FIGS. 1 and 2 indicates a preferred embodiment of the valve of this invention which is shown to include a valve body 12 of generally cylindrical configuration which is preferably formed of metal, molded rubber or phenolic resin or the like, or other suitably strong and rigid material. The valve body has an inlet opening 14 as part of an inlet passage 16, an outlet opening 18 as part of an outlet passage 20, and a valve seat 22 located between the inlet and outlet passages. The valve body also has an aperture 24 in general alignment with the valve seat. The valve seat 22 is provided with any conventional valve seat configuration such as a frustoconical configuration or the configuration of a chordal segment of a sphere or the like and is preferably provided with a resilient seating surface material (not shown) of any conventional type.

A valve member 26 has a valve plug surface 26.1, preferably of a configuration corresponding to the configuration of the valve seat, for mating engagement with the valve seat in closing the valve. This valve member is pivotally mounted on a pivot pin 28 which is supported in the walls of the valve body in any conventional manner as will be understood. The valve member also has a stem portion 26.2 extending out of the valve body through the aperture 24. In accordance with this invention, the valve member 26 is pivotally mounted for movement between the open valve position shown in FIG. 2, wherein the valve member is disposed in the inlet passage 16, and the closed valve position shown in FIG. 1. In this arrangement, the disposition of the valve member in the open valve position within the inlet passage 16 exposes the valve member to the force of fluid flow in the inlet passage, this force serving to urge pivotal movement of the valve member to the noted closed valve position as will be understood.

In accordance with this invention, a flexible diaphragm 30, which is preferably formed of rubber but which may also be made of metal or various nonporous plastic materials, is secured to the valve member around the periphery of the valve member and is secured to the valve body around the periphery of the body aperture 24, thereby to seal the valve body without significantly restricting pivotal movement of the valve member 26. Typically, for example, where the diaphragm is formed of rubber, the valve member is provided with a peripheral groove 26.3 and a diaphragm is of annular disc-like form having its inner edge cemented into the valve member groove 26.3 and having its outer edge cemented to the valve body around the body aperture 24. Of course, where the diaphragm is formed of metal the diaphragm may be welded to the valve stem and the body.

In accordance with this invention, an actuator means 32 of any conventional type is mounted on the valve body outside the valve body and is operatively connected to the valve member stem portion 26.2 for moving the valve member from closed to open valve position when desired. Typically, for example, the actuator means 32 comprises a solenoid apparatus of any conventional type which is mounted on a bracket 32.1 secured to the valve body 12 and which has electrical terminals 32.2 connectable to a power source (not shown) for selectively energizing the solenoid coil 32.3 to draw a solenoid plunger 32.4 into the coil. The solenoid plunger is operatively connected to the valve stem 26.2 by means of a solenoid pin 32.5 which is slidable in a slot 26.4 in the valve member stem. As this actuator means 32 is completely conventional, the actuator means is not further described herein and it will be understood that the actuator means is adapted to be operated when desired, preferably by electrically energizing the actuator means, for pivoting the valve member 26 with selected force from the closed valve position shown in FIG. 1 to the open valve position shown in FIG. 2, the actuator means also being operable, as by electrically deenergizing the actuator means, for permitting the valve member to return to closed valve position in response to the fluid forces in the valve inlet passage.

In accordance with this invention, the flexible diaphragm 30 is proportioned with respect to the location of the pivot pin 28 so that, when the valve member is in closed position as shown in FIG. 1 and when the diaphragm 30 is therefore subjected over the entire area of the aperture 24 to forces resulting from fluid pressure in the valve inlet passage 16, the forces exerted on the diaphragm which would tend to pivot the valve member 26 in a clockwise direction (as viewed in FIG. 1) toward an open valve position are at least counterbalanced by the forces exerted on the diaphragm which would tend to pivot the valve member in the opposite direction toward a closed valve position. Typically, for example, the valve member 26 is pivotally mounted with the center line $a$ of the valve member aligned with the center of the valve seat and with the pivot pin 28 spaced from the center line $a$ oppositely of the valve inlet opening 14 and with the pivot pin 28 located much closer to the diaphragm 30 than to the valve seat 22. The valve inlet passage 16 then includes a chamber 16.1 which is arranged to extend entirely around the valve member 26. Accordingly areas of the flexible diaphragm 30 are exposed to fluid pressure in the valve inlet passage at both sides of the center line $a$ of the valve member as viewed in FIG. 1. The body aperture 24 is preferably arranged somewhat eccentrically with respect to the valve member 26 so that fluid pressures exerted on diaphragm 30 to the left of the pivot pin 28 (as viewed in FIG. 1) are at least counterbalanced by the forces exerted on the diaphragm 30 to the right of the pivot pin 28 (as viewed in FIG. 1). Alternately, the aperture 24 is proportioned and is positioned relative to the valve member 26 so that the forces exerted on the diaphragm to the right of the pivot pin 28 (as viewed in FIG. 1) exceed the forces exerted on the diaphragm to the left of the pivot pin. In these arrangements, where the noted forces on the diaphragm are balanced at either side of the pivot pin 28, the valve member is normally adapted to rest with minimal force in closed valve position when the valve inlet passage is filled with fluid. Alternately, when greater force is applied to the diaphragm 30 to the right of the pivot pin as viewed in FIG. 1, this greater force tends to pivot the valve member for seating the valve member against the valve seat with a selected force when the valve member is in closed position as shown in FIG. 1. Of course, where the pivot pin 28 is located close to the diaphragm 30 and spaced at a considerable distance from the valve seat 22 as shown in the drawings, the valve member is subjected to a very substantial pivoting force from the flow of fluid through the valve inlet passage, over the valve seat 22 and through the valve outlet passage 20 when the valve member is in open valve position shown in FIG. 2. Alternately, the pivot pin 28 is located further from the diaphragm 30 and closer to the valve seat 22 for varying the pivoting force resulting from fluid flow which urges the valve member to closed valve position. In either event, the pin 28 is located so that the valve member is normally urged to closed valve position when fluid is flowing in the valve.

As can be seen, the valve device 10 above-described mounts the valve member 26 so that the weight of the valve member 26 is substantially supported on the pivot pin 28. Proportioning of the valve body aperture 24 and positioning of the body aperture with respect to the valve member 26 are regulated to provide seating of the valve member 26 on the valve seat 22 with the selected minimum seating force that is desired, the force of fluid pressures on the valve member in closed valve position being relatively small. The flexible diaphragm 30 forms a seal around that portion of the valve member which extends outside the valve body into operative engagement with the actuator means 32 without imposing any significant sealing forces that would restrict pivotal movement of the valve member 26. Further, the selected positioning of the pivot pin 28 assures that the force of fluid flow tending to urge the valve member from open to closed valve position is also at the selected level desired. Accordingly, an actuator means 32 operable at very low power levels is adapted to operate the valve 10 as will be understood. In addition, although the valve is characterized by a simple, rugged and inexpensive construction, the valve has the additional advantage that the valve normally closes automatically on the occurrence of a power failure or on failure of an electrical component of the valve.

It should be understood that although a particular embodiment of the valve of this invention has been described by way of illustrating the invention, this invention includes all modifications and equivalents thereof falling within the scope of the appended claims.

We claim:

1. A valve device comprising a valve body having an inlet passage including an inlet opening and an inlet chamber, having an outlet passage extending from one side of said chamber, having a valve seat between said outlet passage and chamber at said one side of said chamber, and having an aperture at the opposite side of said chamber from said valve seat, a valve member having a plug portion to be engaged with said valve seat for closing said valve device and having a stem portion extending into said body aperture, means on said valve body pivotally mounting said valve member for movement between the closed valve position having said plug portion engaging said valve seat and an open valve position having said plug portion spaced from said valve seat, said pivotal mounting means engaging said valve member at a location spaced from said valve seat for permitting fluid flow in said inlet passage over said valve seat to urge said valve member to said closed valve position with selected force, a flexible diaphragm secured in sealing relation to said stem portion and to said valve body around said aperture for sealing said valve body with minimal interference with said pivotal movement of said valve member, and an electrically operable actuator means mounted on said valve body exteriorly thereof and operatively connected with said stem portion for selectively moving said valve member from said closed valve position to said open valve position against said force when said actuator means is electrically energized.

2. A valve device according to claim 1 wherein said valve body aperture is proportioned to expose selected areas of said diaphragm to fluid pressures in said inlet passage at either side of said pivotal mounting means when said valve member is in closed valve position for pivoting said valve member against said valve seat to hold said valve member in said closed valve position with a selected seating force.

* * * * *